United States Patent

Eaton et al.

[15] 3,668,693

[45] June 6, 1972

[54] ANALOG-TO-DIGITAL CONVERTER

[72] Inventors: Bradley C. Eaton, Pompton Plains; Marvin Masel, West Englewood, both of N.J.

[73] Assignee: The Singer Company, New York, N.Y.

[22] Filed: July 20, 1970

[21] Appl. No.: 56,603

[52] U.S. Cl. ....................340/347 SY, 318/20.160

[51] Int. Cl. ....................H03k 13/02

[58] Field of Search ....................340/347 SY; 235/151.11; 318/20.160

[56] References Cited

UNITED STATES PATENTS 3,508,252 4/1970 Blarcom....................340/347 SY 3,325,805 6/1967 Dorey....................340/347 SY

*Primary Examiner*—Maynard R. Wilbur

*Assistant Examiner*—Jeremiah Glassman

*Attorney*—S. A. Giarratana and Thomas W. Kennedy

[57] ABSTRACT

An analog-to-digital converter is provided for converting analog signals representing the sine and cosine of an angle into a 14 bit binary digital output signal from an up-down counter. Selected groups of bits from the counter control attenuation networks which generate an analog representation of the angular value to which the counter is set. The first group of bits, comprising the three most significant bits, controls an octant selection network. A second group of bits, comprising the next three most significant bits, controls two ladder attenuation networks which generate analog representations of the tangent of the portion of the angle in the counter represented by this group of bits. A third group of bits, comprising the remaining bits from the counter output, is employed to control a third ladder attenuation network which generates an analog representation of the portion of the angle in the counter represented by the third group of bits. The octant selection network and three ladder attenuation networks are arranged to modify the two-phase analog input signals to produce an a-c analog error signal representing the magnitude and sense of the angular deviation between the counter setting and the angle represented by the analog input signals. The AC error signal is multiplied by a carrier voltage in a phase-sensitive demodulator to produce a bipolar DC signal which is then applied to a bipolar voltage-to-frequency converter. The output of the voltage-to-frequency converter consists of two series of pulses which are employed to drive the up-down counter to a null setting wherein it produces a binary digital output signal representing the angle defined by the analog input signals.

6 Claims, 7 Drawing Figures

INVENTORS.
BRADLEY C. EATON
MARVIN MASEL

BY

ATTORNEY

INVENTORS
BRADLEY C. EATON
MARVIN MASEL
BY
ATTORNEY

INVENTORS.
BRADLEY C. EATON
MARVIN MASEL
BY
Thomas W. Kennedy,
ATTORNEY

INVENTORS.
BRADLEY C. EATON
MARVIN MASEL

BY Thomas W. Kennedy
ATTORNEY

INVENTORS
BRADLEY C. EATON
MARVIN MASEL
BY
Thomas W. Kennedy
ATTORNEY

PATENTED JUN 6 1972

3,668,693

INVENTORS.
BRADLEY C. EATON
MARVIN MASEL

BY Thomas W. Kennedy

ATTORNEY

ANALOG-TO-DIGITAL CONVERTER

CROSS-REFERENCE TO RELATED PATENTS

Certain essential portions of the present disclosure are incorportated herein by reference to U.S. Pat. No. 3,480,947, entitled "Solid State Digital Control Transformer," by Bob N. Naydan, issued Nov. 25, 1969 and assigned to the assignee of the present invention, and U.S. Pat. No. 3,277,464, entitled "-Digital to Synchro Converter" by Naydan et al, issued Oct. 4, 1966 and also assigned to the assignee of the present invention.

BACKGROUND OF THE INVENTION

1. Field of the Invention

This invention relates generally to analog-to-digital conversion devices and more particularly to a solid state analog-to-digital converter which is especially adapted for use with the analog output signals provided by spatial orientation responsive devices, such as synchros and resolvers and the like.

2. Description of the Prior Art

Mechanical-electrical transducers, such as synchros and resolvers, are employed in a wide variety of navigation, guidance and control systems to provide positional information such as shaft position or angle in the form of analog output signals. Due to the increasing popularity of digital information-handling systems, it was once believed that synchros and resolvers would be supplanted by digital transducers, such as shaft encoders of the magnetic, optical or mechanical type, which directly produce the output signals in digital rather than analog form for direct application to the digital information-handling systems. The anticipated substitution of digital shaft encoders for synchros and resolvers has not happened to the degree anticipated however because synchros and resolvers mechanically rugged, are low in cost, use few wires or slip rings, and provide excellent noise immunity for data transmission. Accordingly, there is a definite need and utility for conversion devices adapted to convert the analog output signals from synchros and resolvers into binary digital form.

A well-known, prior art analog-to-digital conversion system for synchros and resolvers utilized an electromechanical servo system in which the output of the synchro or resolver was transmitted to a control transformer. The control transformer produced an AC error signal which represented the positional difference between the synchro shaft and the rotor of the control transformer. The error signal was then amplified and applied to a two-phase servo motor which was mechanically coupled to the rotor of the control transformer. When the control transformer was driven by the servo motor to a null position, wherein the AC error signal became zero, the shaft position of the control transformer represented the shaft position or angle of the synchro transmitter. A digital shaft encoder device was also driven by the servo motor to provide the required digital output signals representing the synchro angle. Although this arrangement suffered from many defects, such as large size and weight, limited accuracy and a fairly slow response time, it did offer a definite advantage in that any harmonics or quadrature signals generated by the control transformer or synchro transmitter were rejected by the two-phase servo motor. This occurred because the torque and speed of the servo motor are nearly proportional to the product of the fixed and variable phase voltages. Consequently, multiplication of a sine wave of fundamental frequency representing fixed-phase excitation by any harmonic components of the variable phase, produces no net DC torque or speed but only ripple components.

In other prior art analog-to-digital conversion systems, the electromechanical servo is replaced by a group of transformers which are switched either by transistors or relays. This type of system does not readily lend itself to multiplex operations and the transformers themselves produce a rather large and bulky package for the system. In a widely used prior art arrangement, the sine and cosine output voltages of a resolver or other four-wire device are rectified for about one-half cycle of the carrier frequency and the resulting DC voltages are then applied to a DC to digital converter. For example, in one such arrangement, the cosine voltage is used as the voltage reference of a successive approximation converter and the sine voltage is encoded to obtain the digital tangent. Although these DC arrangements permit the construction of analog-to-digital converters without moving parts, and of fairly compact size, they suffer from the requirement that the resistance-capacitance products used in converting the AC signal to DC must be very closely tracked. Additionally, these systems suffer from limitations produced by drift errors of the DC amplifiers employed. The DC amplifier problem is particularly difficult in so-called "high-speed successive approximation converters" because an extremely fast recovery after each comparison is required and the requirement of a fast recovery conflicts with the requirement of low drift. Finally, in other known "solid state" conversion arrangements, sine and cosine functions of a digital angle are generated by means of complex straight line or quadratic interpolation techniques. The resolver sine signal is usually multiplied by an artificially generated cosine function and the cosine resolver signal is multiplied by an artificially-generated sine function, so that the difference between the two signals represents an error signal proportional to the input angle in the resolver. In these systems, however, the circuitry required for the generation of the sine and cosine functions of the digital angle is rather complex.

SUMMARY OF THE INVENTION

It is an object of this invention to provide an analog-to-digital converter for two-phase analog positional signals which does not have any moving parts and which preserves the feature of multiplication of an AC error signal by an AC reference voltage, to hereby eliminate errors caused by harmonics and quadrature generation in the input.

It is a further object of this invention to provide an analog-to-digital converter for two-phase analog input signals which operates as an AC system rather than a DC system, to thereby eliminate any significant errors arising from DC amplifier drift, switch offset, or capacitor instability.

It is a still further object of this invention to provide an analog-to-digital converter for two-phase analog input signals which is especially suited for multiplex operations wherein the converter must have an extremely fast response time in order to avoid any "staleness" of data.

It is another object of this invention to provide a solid state analog-to-digital converter for the two-phase analog positional signals wherein the converter is highly accurate in operation and yet is relatively simple in construction.

The term "two-phase analog signals" when used in the disclosure and claims herein shall be deemed to mean two-position phase analog signals, i.e., one signal has an amplitude proportional to the sine of the angle defined by the signals and the other signal has an amplitude proportional to the cosine of the angle. The time phase relationship is either 0° or 180°.

Briefly, the analog-to-digital converter of the present invention acts in the manner of a solid state proportional servo system to convert two-phase analog input signals representing an angle into binary digital output signals representing the angle. Binary digital output signals representing the estimated value of the angle are produced by up-down counter means and are applied to digitally controlled circuit means for control thereof. The digitally controlled circuit means, which may take the form of attenuation networks, are adapted to receive the two-phase analog input signals and modify them in response to the binary digital output signals of the up-down counter in such manner as to produce an AC analog error signal having an amplitude and phase respectively representing the magnitude and sense of the difference between the estimated value of the angle in the counter and the true value of the angle as represented by the analog input signals. The resulting AC error signal is applied to phase-sensitive demodulator means which, multiplies the AC error signal by an AC reference signal to produce DC output signals having a magnitude and polarity respectively representing the amplitude and phase of the AC error signal. A bipolar voltage-to-frequency converter is coupled between the output of the demodulator means and the input to the counter means to convert the DC output signals into a series of digital pulse output signals having a pulse repetition rate representing the magnitude of the DC output signals, so that the digital pulse output signals from the voltage-to-frequency converter operate to drive the counter means to a null setting wherein the binary digital output from the counter means represents the true value of the angle.

The digitally controlled circuit means may comprise summing amplifier means and several digitally controlled attenuation networks which are selectively operable in response to selected bits of the binary digital output signals from the counter means. In the preferred embodiment of the invention, one of the digitally controlled attenuation networks operates as an octant selection network which is responsive to a first group of the most significant bits of the binary digital output signals from the counter. Second and third digitally controlled attenuation networks serve to generate tangent functions of the portion of the angle in the counter means represented by a second group of the most significant bits and a fourth digitally controlled attenuation network is arranged to multiply certain of the generated analog signals by an angle proportional to a third group of bits comprising the remaining bits of the angle in the counter means. The digitally controlled attenuation networks selectively modify the two-phase analog input signals to produce the foregoing generated functions of the digital angle in the counter and the outputs of the networks are combined in the summing amplifier to produce an AC error signal having the form $\sin(\theta_T-\mu)[\beta\tan\alpha-1]+\cos(\theta_T-\mu)[\tan\alpha+\beta]$, where $\theta_T$ is the angle represented by the two-phase analog input signals, $\mu$ is proportional to the portion of the angle in the counter represented by the first group of bits, $\alpha$ is proportional to the portion of the angle in the counter represented by the second group of bits, and $\beta$ is proportional to the portion of the angle in the counter represented by the third group of bits. This method of generating the AC error signal permits a material simplification of the attenuation networks employed and produces a highly accurate digital read-out by the counter of the angle defined by the two-phase analog input signals.

The nature of the invention and other objects and additional advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
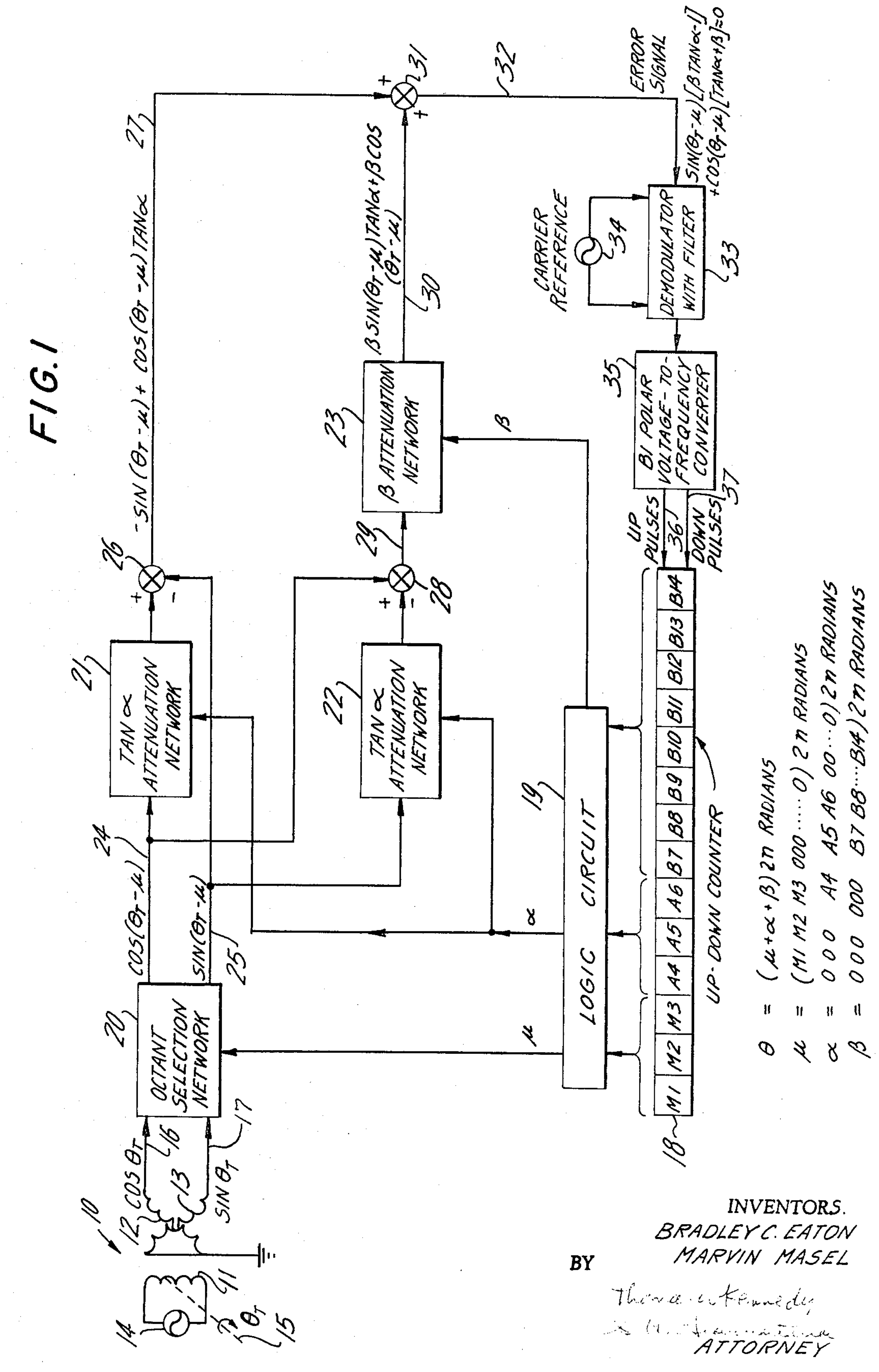
FIG. 1 is a schematic block diagram of an analog-to-digital converter suitable for use with two-phase analog input signals and constructed in accordance with the teachings of the present invention.

Referring now to FIG. 1 of the drawings, there is shown an analog-to-digital converter constructed in accordance with the teachings of the present invention and which is suitable for use in converting two-phase analog input signals from a resolver or the like into binary digital output signals representing the resolver angle. A resolver 10 is shown as having a rotor winding 11 and interconnected stator windings 12 and 13. The rotor winding 11 is energized by an AC supply source 14 and is mechanically positioned by a resolver shaft 15 which is rotated to an angle $\theta_T$. In practice, the frequency of the supply source for many aircraft navigation and guidance systems is 400 Hz. The resolver, in a known manner, serves to provide a pair of two-phase analog input signals of sinusoidal form which represent the sine and cosine of the angle $\theta_T$. These analog input signals, which are shown in the drawing as cos $\theta_T$ appearing on an output lead 16 of the resolver and sine $\theta_T$ appearing on an output lead 17, completely define the angle $\theta_T$ to which the resolver shaft 15 is set. As hereinbefore explained, it is desirable to convert the two-phase analog input signals into binary digital output signals representing the angle $\theta_T$ of the resolver. For this purpose, a counter 18, which is of the "up-down" type, is provided to produce a 14 bit binary digital output which represents the estimated value $\theta_E$ of the input angle of the resolver. As seen in the drawing, the estimated value $\theta_E$ of the resolver angle is represented by the 14 bit binary output from the counter 18, wherein bits M1, M2 and M3 are the most significant bits and represent a portion $\mu$ of the angle $\theta_E$ in the counter. Bits A4, A5 and A6 are the next most significant bits and represent a portion $\alpha$ of the angle in the counter. Finally, bits B7 through B14 of the binary digital output signal represent the least significant portion $\beta$ of the angle in the counter.

The 14 bit binary digital output from counter 18 is applied to a logic circuit 19 which serves to control an octant selection network 20, a first tan $\alpha$ attenuation network 21, a second tan $\alpha$ attenuation network 22 and a $\beta$ attenuation network 23. The networks 20—23 modify the analog input signals to produce an AC error signal having an amplitude and phase respectively representing the magnitude and sense of the deviation between the estimated value $\theta_E$ of the angle in the counter 18 and the true value $\theta_T$ of the angle to which the resolver shaft 15 is set. The octant selection network 20 selectively attenuates the cos $\theta_T$ and sin $\theta_T$ signals appearing at leads 16 and 17 in accordance with the three most significant bits M1, M2 and M3 of the digital angle in the counter 18 to provide a first output 24 representing $\cos(\theta_T-\mu)$ and a second output 25 representing $\sin(\theta_T-\mu)$. The signal representing $\cos(\theta_T-\mu)$ is applied to the first tan $\alpha$ attenuation network 21 wherein it is multiplied by the tangent of the portion of the angle in the counter represented by bits A4, A5 and A6. The resulting signal $\cos(\theta_T-\mu)\tan\alpha$ is differenced with the $\sin(\theta_T-\mu)$ signal at a point 26 to provide an output at 27 having the form $-\sin(\theta_T-\mu)+\cos(\theta_T-\mu)\tan\alpha$. The $\sin(\theta_T-\mu)$ signal appearing at output 25 of the octant selection network is also multiplied by the tangent of $\alpha$ in the second tan $\alpha$ attenuation network 22 and the resultant product is added to the $\cos(\theta_T-\mu)$ signal at point 28 to provide an output signal at output 29 in the form $\sin(\theta_T-\alpha\mu)\tan\alpha+\cos(\theta_T-\mu)$. This output is applied to $\beta$ attenuation network 23 to provide an output at 30 having the form $\beta\sin(\theta_T-\mu)\tan\alpha+\beta\cos(\theta_T-\mu)$. The outputs 27 and 30 are summed at 31 to provide an AC error signal at 32 having the form $\sin(\theta_T-\mu)[\beta\tan\alpha-1]+\cos(\theta_T-\mu)[\tan\alpha+\beta]$.

It can be demonstrated mathematically that the amplitude and phase of the AC error signal respectively represent the magnitude and sense of the deviation between the estimated value $\theta_E$ of the digital angle in the counter and the true value $\theta_T$ of the resolver shaft setting. In effect, for suitable increments of $\alpha$ and $\beta$, the $[\beta\tan\alpha-1]$ term in the error signal is a very close approximation of $\cos(\alpha+\beta)$ and the $[\tan\alpha+\beta]$ term is a close approximation of $\sin(\alpha+\beta)$, so that the analog input signal representing the sin of the resolver angle is multiplied by a cosine function of the digital angle and the analog cosine signal is multiplied by a sine function of the digital angle. The AC error signal appearing at 32 is applied to a phase-sensitive demodulator and filter 33 wherein it is multiplied by an AC carrier reference signal from source 34 and then filtered to provide a DC output signal having a magnitude and polarity respectively representing the amplitude and phase of the AC error signal. The filter serves to remove twice frequency components generated during the demodulation process, so that the DC signal alone is applied to a bipolar voltage-to-frequency converter 35. The voltage-to-frequency converter 35 functions to convert the DC signal from the demodulator 33 into a first series of pulses 36 and a second series of pulses 37 which are employed to drive the up-down counter 18. The pulse repetition rate of each series of output pulses represents the magnitude of the deviation between the value of the digital angle in the counter 18 and the true value $\theta_T$ of the resolver shaft setting in the particular direction represented by that series. By virtue of this arrangement, the up-down counter 18 can be driven in either direction to a null position wherein the 14 bit binary output from the counter accurately represents the angle defined by the cos $\theta_T$ and sin $\theta_T$ analog input signals.

Figure 2:
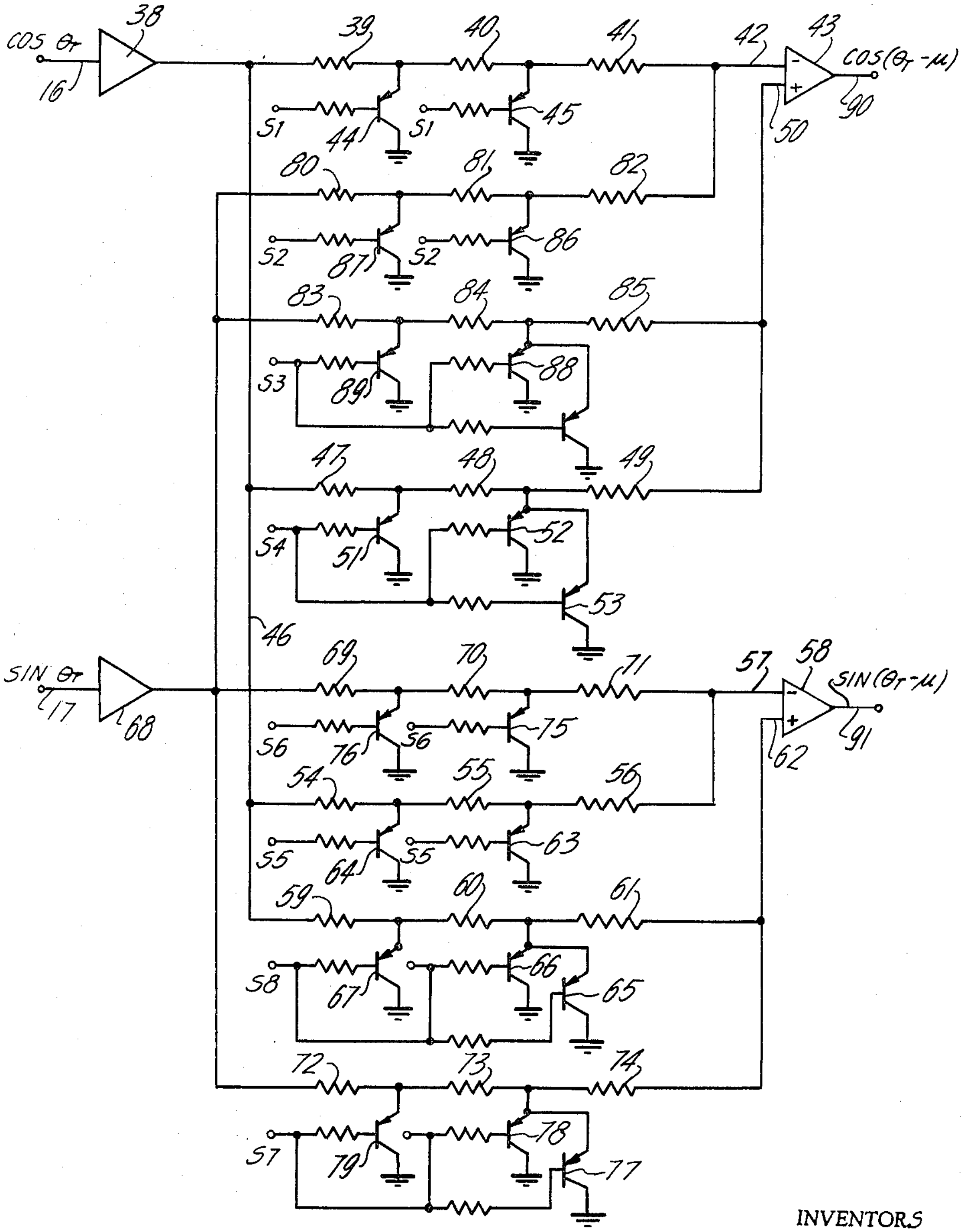
FIG. 2 is a schematic circuit diagram showing the detailed construction of the octant selection network of the converter.

The detailed construction of the octant selection network 20 is shown in FIG. 2 of the drawings wherein it is seen that the cos $\theta_T$ signal from the resolver 10 is applied to an operational amplifier 38 which may, for example, comprise a type 101 operational amplifier. The output from amplifier 38 is applied through serially connected resistors 39, 40 and 41 to an inverting input 42 of an operational amplifier 43. The junction between resistors 39 and 40 is connected to ground through a transistor switch 44 having a control terminal S1 and the junction between resistor 40 and 41 is connected to ground through a transistor switch 45 which is connected to the same control terminal S1. The output signal from amplifier 38 is also applied by means of a lead 46 to serially connected resistors 47, 48 and 49 which are connected to non-inverting input 50 of the operational amplifier 43. The junction between resistors 47 and 48 is connected to ground through a transistor switch 51 which is controlled by a terminal S4 and the junction between resistors 48 and 49 is connected to ground through transistor switches 52 and 53 which are also controlled by the S4 terminal. In a similar manner, the output from amplifier 38 is connected through serially connected resistors 54, 55 and 56 to the inverting input 57 of an operational amplifier 58 and through serially connected resistors 59, 60 and 61 to the non-inverting input 62 of the amplifier. A similar transistor switch arrangement consisting of transistors 63 and 64 is provided to shunt the junctions of resistors 54 and 55 and 55 and 56 to ground in accordance with signals applied to a control terminal S5. Transistor switches 65, 66 and 67 are provided to shunt the junctions of resistors 59, 60 and 61 to ground in accordance with signals applied to a control terminal S8.

The analog input signal sin $\theta_T$ appearing at the output 17 of resolver 10 is applied to an operational amplifier 68 and thence to the inverting input 57 of operational amplifier 58 through serially connected resistors 69, 70 and 71. The same signal is also applied to the non-inverting input 62 of amplifier 58 through serially connected resistors 72, 73 and 74. Resistors 69, 70 and 71 are shunted to ground through transistor switches 75 and 76 which are actuated by a control terminal S6, while resistors 72, 73 and 74 are shunted to ground by a transistor switch arrangement consisting of transistors 77, 78 and 79 which are actuated by a control terminal S7. In a similar manner, the sin $\theta_T$ signal is also applied to the inverting input 42 of operational amplifier 43 through serially connected resistors 80, 81 and 82 and to the non-inverting input 50 of the same amplifier through resistors 83, 84 and 85. Resistors 80, 81 and 82 are connected to ground through transistor switches 86 and 87 which are controlled by switch terminal S2 while resistors 83, 84 and 85 are shunted to ground through transistor switches 88 and 89 which are controlled by a switch terminal S3. In practice, amplifiers 43, 58 and 68 may also comprise type 101 operational amplifiers.

Figure 6:
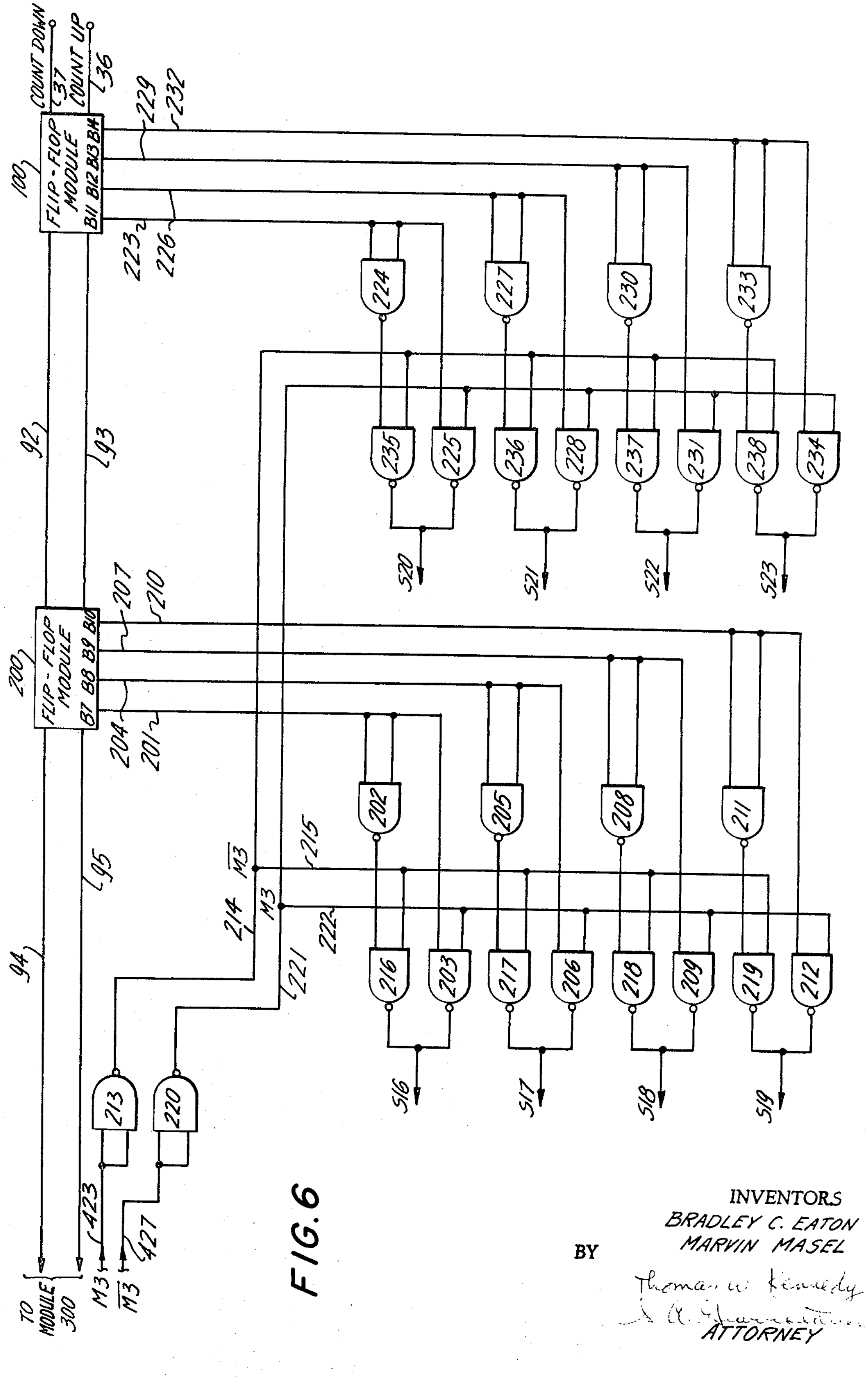
FIG. 6 is a portion of the logic circuit of the converter showing the logic circuitry for the bits employed to control the $\beta$ attenuation network.
Figure 7:
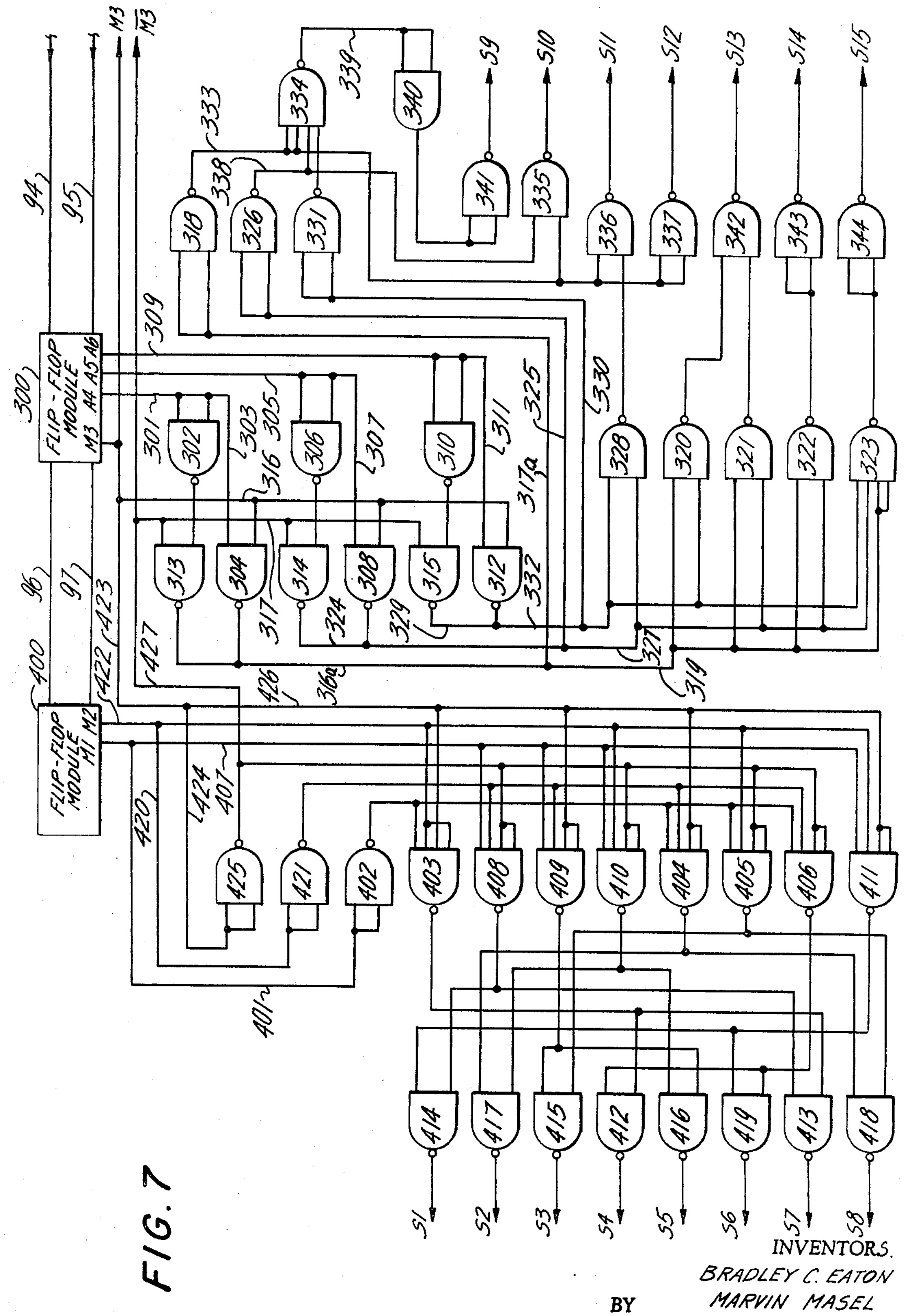
FIG. 7 is the remaining portion of the logic circuit of the converter showing the logic circuitry for the bits employed to control the octant selection network and the two, tan $\alpha$ attenuation networks.

As explained in the aforementioned U.S. Pat. to Naydan, No. 3,480,947, the control switch terminals S1 through S8 may be controlled by suitable logic circuitry to selectively attenuate and combine the cos $\theta_T$ and sin $\theta_T$ signals from the resolver output in such a manner as to provide a voltage at the output 90 of operational amplifier 43 which is proportional to cos $(\theta_T-\mu)$ and a voltage at the output 91 of operational amplifier 58 which is proportional to sin $(\theta_T-\mu)$. In the present arrangement, switch control terminals S1 through S8 are controlled by the three most significant bits, M1, M2 and M3, of the binary digital output from the up-down counter 18. These three bits determine the octant or $\mu$ portion of the generated analog signal representing the estimated value of the angle in the counter. The logic circuit 19 which is operable to control the switch terminals S1 through S8 is shown in FIGS. 6 and 7 of the drawings wherein it is seen that the up-down counter 18 may conveniently comprise four flip-flop modules 100, 200, 300, and 400. Each flip-flop module consists of four flip-flop circuits which are packaged together in module form for convenience. The four separate modules 100 through 400 are interconnected by leads 92, 93, 94, 95, 96 and 97 to form an up-down counter which is actuated by the inputs 36 and 37 from the bipolar voltage-to-frequency converter 35. The three bits M1, M2 and M3 which control the octant selection network 20 are associated with modules 300 and 400 which are shown in FIG. 7 of the drawings. It is seen that bits M1 and M2 are produced by module 400, while bit M3 is produced by module 300. Bit M1 is applied by a lead 401 to both inputs of a dual-input NAND gate 402 which produces the bit M1 at its output. The output of gate 402 is connected to one input of each of quad input NAND gates 403, 404, 405 and 406. Bit $\overline{M1}$ is also connected by lead 407 to one input of quad input NAND gates 408, 409, 410 and 411. Gates 403, 404, 405, 406, 408, 409, 410 and 411 have two of their four inputs connected together to provide a three input gate. The output of gate 403 is applied to one input of a dual input NAND gate 412 which has its output connected to control switch terminal S4. The output of gate 403 is also applied to one input of a dual NAND gate 413 having its output connected to the switch terminal S7. Gate 408 has its output connected in similar fashion to one input of each of dual input NAND gates 413 and 414 which have their respective outputs connected to switch terminals S7 and S1. The output of gate 409 is connected to one input of each of dual input NAND gates 415 and 416 which have their outputs connected respectively to the control switch terminal S3 and terminal S5. The gate 410 similarly controls one input of NAND gates 416 and 417 which respectively control switch terminals S5 and S2. The output of gate 404 is connected to one input of each of NAND gates 417 and 418 which respectively control terminals S2 and S8. Gate 405 has its output connected to one of the inputs of each of gates 415 and 418 while gate 406 is connected to one input of each of gates 419 and 412. The output of gate 419 controls switch terminal S6. Finally, gate 411 is connected to one input of each of gates 419 and 414.

Bit M2 is applied by a lead 420 to both inputs of a dual input NAND gate 421 which provides bit $\overline{M2}$ as its output. The $\overline{M2}$ bit so generated is applied to one input of each of gates 408, 409, 404 and 406. The M2 bit from the counter is also applied by a lead 422 to one input of each of gates 403, 410, 405 and 411. The M3 bit from module 300 is applied by leads 423 and 424 to both inputs of a dual input NAND gate 425 which provides an $\overline{M3}$ bit at its output. The $\overline{M3}$ bit is applied to one input of each of gates 408, 410, 405 and 406. The M3 bit from the counter is also applied by leads 423 and 426 to one input of each of gates 403, 409, 404 and 411. By virtue of this arrangement, each of the control terminals is controlled by bits M1, M2 and M3 and their inverse bits.

As explained in the aforementioned U.S. Pat. to Naydan, No. 3,480,947, the current conduction through the various resistive paths in the octant selection network 20 shown in FIG. 2 of the drawings is controlled by the binary coding of bits M1, M2 and M3 which effectively control the transistor switches in each of the resistive branches of the selection network. The total value of the three resistors in each branch of the network is the same for each branch, so that the octant selection network acts in the same manner as a plurality of switches to present selected combinations of the cos $\theta_T$ and sin $\theta_T$ signals to amplifiers 43 and 58. Since the sign and relative magnitude for sine and cosine functions have a unique combination in each octant, the eight combinations of bits M1, M2 and M3 define the octant of the digital angle in the counter. The following Table I shows the octant decoding employed in a preferred embodiment of the invention:

TABLE I

| Input Angle | M1 | M2 | M3 | Switches Opened |
|---|---|---|---|---|
| 0°–44.98° | 0 | 0 | 0 | S4 and S6 |
| 45°–89.98° | 0 | 0 | 1 | S2 and S8 |
| 90°–134.98° | 0 | 1 | 0 | S3 and S8 |
| 135°–179.98° | 0 | 1 | 1 | S4 and S7 |
| 180°–224.98° | 1 | 0 | 11 | S1 and S7 |
| 225°–269.98° | 1 | 0 | 1 | S3 and S5 |
| 270°–314.98° | 1 | 1 | 0 | S2 and S5 |
| 315°–359.98° | 1 | 1 | 1 | S1 and S6 |

In the foregoing table, a binary "0" represents a low output from the counter and a binary "1" represents a high output. From the foregoing table it is seen that each of the eight octants of the generated analog signal representing the digital angle in the counter is determined by the opening of different pairs of transistor switches, so that each octant is uniquely defined by a combination of the three bits M1, M2 and M3. For example, for an angle of 10.00°, M1, M2 and M3 are all producing a low output at the counter. This combination causes switches S4 and S6 to be turned off thereby allowing current to flow through a first path formed by resistors 47, 48 and 49 and a second path formed by resistors 69, 70 and 71. The current flow through the branch formed by resistors 47, 48 and 49 applies the cos $\theta_T$ signal from amplifier 38 to the non-inverting input 50 of amplifier 43 while the flow through resistors 69, 70 and 71 applies the sin $\theta_T$ signal from amplifier 68 to the inverting input 57 of amplifier 58. For this combination of the octant bits all of the other switches in the octant network are turned on thereby preventing any current from flowing through the resistive paths controlled by these switches.

Figure 3:
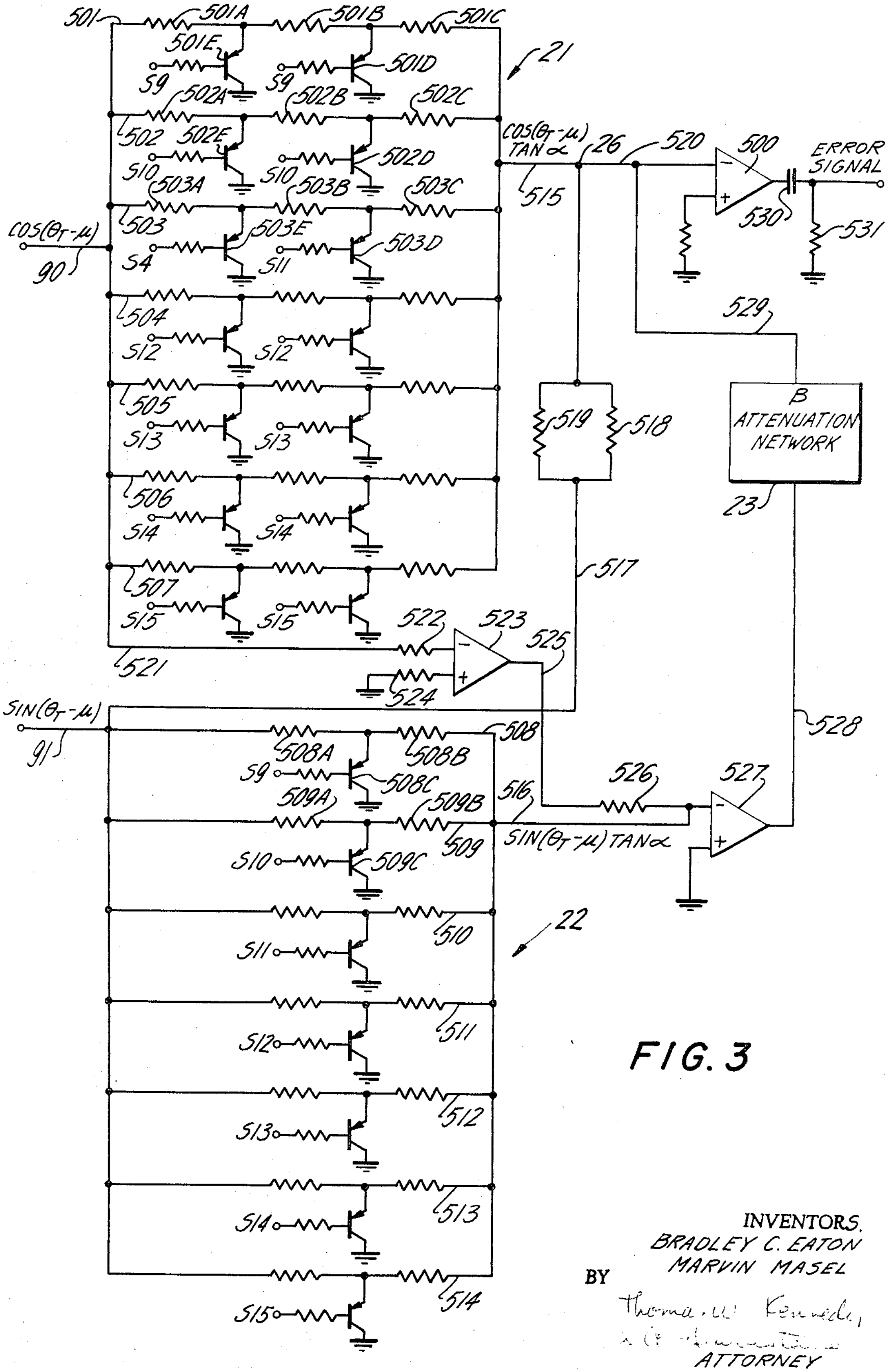
FIG. 3 is a schematic circuit diagram showing the detailed construction of the tangent $\alpha$ attenuation networks and their interconnection with the $\beta$ attenuation network of the converter.

Referring again to FIG. 1 of the drawings, it is seen that the cos $(\theta_T - \mu)$ and sin $(\theta_T - \mu)$ signals appearing respectively at the outputs 24 and 25 of the octant selection network are next applied to the tan $\alpha$ attenuation networks 21 and 22 where they are multiplied by the tangent function of the portion of the counter angle represented by bits A4, A5 and A6. The circuit arrangement of each of the tan $\alpha$ attenuation networks and the means for selectively combining these signals to form the AC error signal is shown in FIG. 3 of the drawings. As seen in FIG. 3, the output 90 from operational amplifier 43 in the octant selection network 20 is applied directly to the tan $\alpha$ attenuation network 21 and the resultant product is applied to the inverting input of an operational amplifier 500. The tan $\alpha$ attenuation network 21 consists of seven parallel branches 501 through 507. Each of the branches has three serially connected resistors therein. Accordingly, branch 501 is composed of resistors 501A, 501B and 501C, while branch 502 is composed of resistors 502A, 502B and 502C. Each of the remaining five branches is similarly composed of three resistors. The junction point between the B and C resistors of each branch is connected to ground through a transistor switch D while the junction point between the A and B resistors of the same branch is also connected to ground through a transistor switch E. Both transistor switches in each branch are connected to a common control terminal for the branch and are actuated by the same output of the logic circuit. For example, the junction between resistors 501B and 501C in branch 501 is connected to ground through transistor switch 501D, while the junction between 501A and 501B is connected to ground through transistor switch 501E. Both transistor switches 501D and 501E are connected to a common control terminal S9 and are actuated by the same output of logic circuit 19. It will be noted that the transistor switches in each of the seven branch circuits are connected to a different control switch terminal, so that terminal S10 controls branch 502, terminal S11 controls branch 503, terminal S12 controls branch 504, terminal S13 controls branch 505, terminal S14 controls branch 506 and terminal S15 controls branch 507. The resistors in each branch of the tan $\alpha$ attenuation network 21 are given a binary digital ladder value with respect to the other resistors in the network in order to provide a current at the output of the network which is proportional to the tangent of the portion of the digital angle in the counter represented by the bits A4, A5 and A6. Current conductivity through each branch is controlled by actuation of the switch terminal for that branch so that selective branches may be caused to conduct at the same time in order to produce the required values of output current for different combinations of the A4, A5 and A6 bits.

The tan $\alpha$ attenuation network 22 which multiplies the sin $(\theta_T - \mu)$ signal by the tangent of $\alpha$ is similarly composed of seven branches, 508 through 514. Each branch circuit, however, is composed of only two, serially connected resistors which have their junction point connected to ground through a single transistor switch which is connected to a different one of the control terminals S9 through S15. For example, branch 508 is composed of resistors 508A and 508B and the junction point of the two resistors is connected to ground through a single transistor switch 508C which is connected to the control switch terminal S9. Similarly, branch circuit 509 is composed of resistors 509A and 509B which have their junction point connected to ground through a transistor switch 509C which is connected to the control terminal S10. Again, each of the resistors in the branches 508 through 514 is given a binary digital ladder value relative to the other branches so that the network produces an output current which is equal to the product of the input current and tan $\alpha$. It may be noted that the tan $\alpha$ attenuation network 22 is of somewhat simpler construction than the tan $\alpha$ attenuation network 21. This expediency is permitted because the tan $\alpha$ attenuation network 22 operates to multiply the sin $(\theta_T - \mu)$ signal by the tangent of $\alpha$ and the resultant product is applied to the $\beta$ attenuation network 23 for further processing. Since the $\beta$ processing is responsive only to the lower order or least significant bits of the 14 bit binary digital output signal from the counter 18, it follows that the tan $\alpha$ signal which is needed for application to this network may be generated with considerably less accuracy than the tan $\beta$ signal which is applied directly to the amplifier 500. The lower scale factor here, which is of the order of ten, permits a material simplification in the structure of the tan $\alpha$ attenuation net-work 22.

The logic circuitry for controlling the switch terminals S9 through S15 is shown in FIG. 7 of the drawings wherein it is seen that the logic circuitry for the tan $\alpha$ networks 21 and 22 is responsive to bits M3, A4, A5 and A6. Bit A4 is applied by a lead 301 to both inputs of a dual input NAND gate 302 and by a lead 303 to one input of a dual input NAND gate 304. Bit A5 is applied by means of a lead 305 to both inputs of a dual input NAND gate 306 and by means of a lead 307 to one input of a dual input NAND gate 308. Similarly, bit A6 is applied by a lead 309 to both inputs of a NAND gate 310 and by a lead 311 to one input of a NAND gate 312. The output of gate 302 is the bit $\overline{A4}$ and is applied to one input of a dual input NAND gate 313. The output of gate 306 consists of $\overline{A8}$ and is applied directly to one input of NAND gate 314, while the output of gate 310 consists of $\overline{A6}$ and is applied directly to one input of a NAND gate 315. It will be noted that the bit M3 is applied by means of lead 316 to the other input of each of NAND gates 304, 308 and 312, while the bit $\overline{M3}$ is applied by means of a lead 317 to the other input of each of dual input NAND gates 313, 314 and 315. By virtue of this arrangement, each of the gates 304, 308, 312, 313, 314 and 315 is controlled by two different bits from the group consisting of $\overline{M3}$, A4, $\overline{A4}$, A5, $\overline{A5}$, A6, and $\overline{A6}$. The output of gates 313 and 304 is applied by leads 316A and 317A to both inputs of a dual input NAND gate 318 and by means of a lead 319 to one input of each of dual input NAND gates 320, 321 and 322. The same output is also applied to quad input NAND gate 323. The output of gates 308 and 314 is applied by a lead 324 and a lead 325 to the both inputs of a dual input NAND gate 326 and by means of a lead 327 to one input of each of NAND gates 328, 321, 322 and 323. The outputs of gates 312 and 315 are connected by leads 329 and 330 to both inputs of a dual input NAND gate 331 and by means of a lead 332 to one input of each of NAND gates 328, 320 and 323. The output of gate 318 is applied by a lead 333 to one input of a quad input NAND gate 334 and to one input of each of dual input NAND gates 335, 336 and 337, while the output of gate 326 is applied by a lead 338 to one input of gate 334 and to one input of gate 335. The output of gate 331 is applied directly to one input of the gate 334 and the output of the gate 334 is applied by lead 339 to both inputs of a dual input NAND gate 340 which has its output connected to both inputs of a dual input NAND gate 341. The output of gate 341 is connected directly to switch terminal S9 and the output of gate 335 is coupled directly to switch terminal S10. The output of gate 328 is coupled to one input of gate 336 and the output of that gate is coupled directly to control terminal S11. The output of gate 337 is connected to terminal S12. The outputs of gates 320 and 321 are coupled to the two inputs of a dual input NAND gate 342 which has its output connected directly to switch terminal S13. The output of gate 322 is coupled to both inputs of a dual input NAND gate 343 which has its output connected to control switch terminal S14. Finally, the output of gate 323 is coupled to both input terminals of a dual input NAND gate 344 which has its output connected to switch terminals S15.

By virtue of this arrangement, each of the control switch terminals S9 through S15 is controlled by a definite combination of bits A4, A5 and A6, as well as by the bit M3 which is the least significant bit of the octant controlling group. The logic for the tangent $\alpha$ encoding is shown in the following Table II:

TABLE II

| Angle | A4 | A5 | A6 | Switches Closed |
|---|---|---|---|---|
| 0°–5.603° | 0 | 0 | 0 | None |
| 5.625°–11.228° | 0 | 0 | 0 | S9 |
| 11.250°–16.853° | 0 | 1 | 0 | S9, S10 |
| 16.875°–22.478° | 0 | 1 | 1 | S9, S10 and S11 |
| 22.500°–28.103° | 1 | 0 | 0 | S9–S12 |
| 28.125°–33,728° | 1 | 0 | 1 | S9–S13 |
| 33.750°–39.353° | 1 | 1 | 0 | S9–S14 |
| 39.375°–44.978° | 1 | 1 | 1 | All |

Referring again to FIG. 3 of the drawings, when the switch terminals S9 through S15 are actuated by the output of logic circuit 19, each switch so actuated operates to shunt the signal to ground in the resistive path associated with that switch, so that the selected branches of the ladder networks 21 and 22 are not conducting any signal to their respective output leads 515 and 516. These switch terminals are selectively controlled by the three bits A4, A5 and A6 in accordance with the logic of Table II. For example, for an angle of 10.00° A4, A5 and A6 are 0, 0 and 1 respectively and only switch S9 is on. Accordingly, at this time no current passes through branches 501 and 508 of the tan $\alpha$ attenuation networks. The remaining branches of each network are conducting, however, and the sum of the currents so produced provides an output for each network which is the tangent of the angle (10.00°) represented by this combination of bits. As seen in Table II, the tan $\alpha$ networks excercise control in increments of 5.625°. The relative resistances of the branches of each of the tan $\alpha$ attenuation networks are so proportioned that the relative conductivity of the branches in each network increases proportional to the tangent of $\alpha$.

The effect of the foregoing operation is to cause the cos $(\theta_T-\mu)$ to signal appearing at the input to network 21 to be multiplied by tan $\alpha$ thereby producing the signal cos $(\theta_T-\mu)$ tan $\alpha$ at the output lead 515 of that network. Similarly, ladder network 22 functions to multiply the sin $(\theta_T-\mu)$ signal appearing on lead 91 by tan $\alpha$ to produce the signal sin $(\theta_T-\mu)$ tan $\alpha$ at the output 516 of that network. It may be noted at this time that a lead 517 serves to connect the sin $(\theta_T-\mu)$ signal at the input to the tan $\alpha$ network 22 through a pair of parallel-connected resistors 518 and 519 to the circuit junction point 26 which effectively causes the sin $(\theta_T-\mu)$ signal to be subtracted from the cos $(\theta_T-\mu)$ tan $\alpha$ signal appearing at the output of ladder network 21. This difference signal shown schematically at output lead 27 in FIG. 1 of the drawings is connected by a lead 520 in FIG. 3 to the inverting input of operational amplifier 500. At the same time, a lead 521 and resistor 522 serve to connect the cos $(74_T-\mu)$ signal appearing at the input 90 of the network 21 to the inverting input of an operational amplifier 532. The non-inverting input of amplifier 523 is connected to ground through resistor 524, so that the amplifier effectively operates to invert the polarity of the signal passing through it. The inverted polarity output from the amplifier is applied by a lead 525 and a resistor 526 to the inverting input of an operational amplifier 527. The output from tan $\alpha$ network 22 is also applied by lead 516 to the same inverting input of amplifier 527, so that the output of the amplifier appearing at lead 528 represents sin $(\theta_T-\mu)$ tan $\alpha$ + cos $(\theta_T-\mu)$. This signal is applied to the $\beta$ attenuation network 23 where it is multiplied by $\beta$ and applied by a lead 529 to the inverting input of summing amplifier 500.

Figure 4:
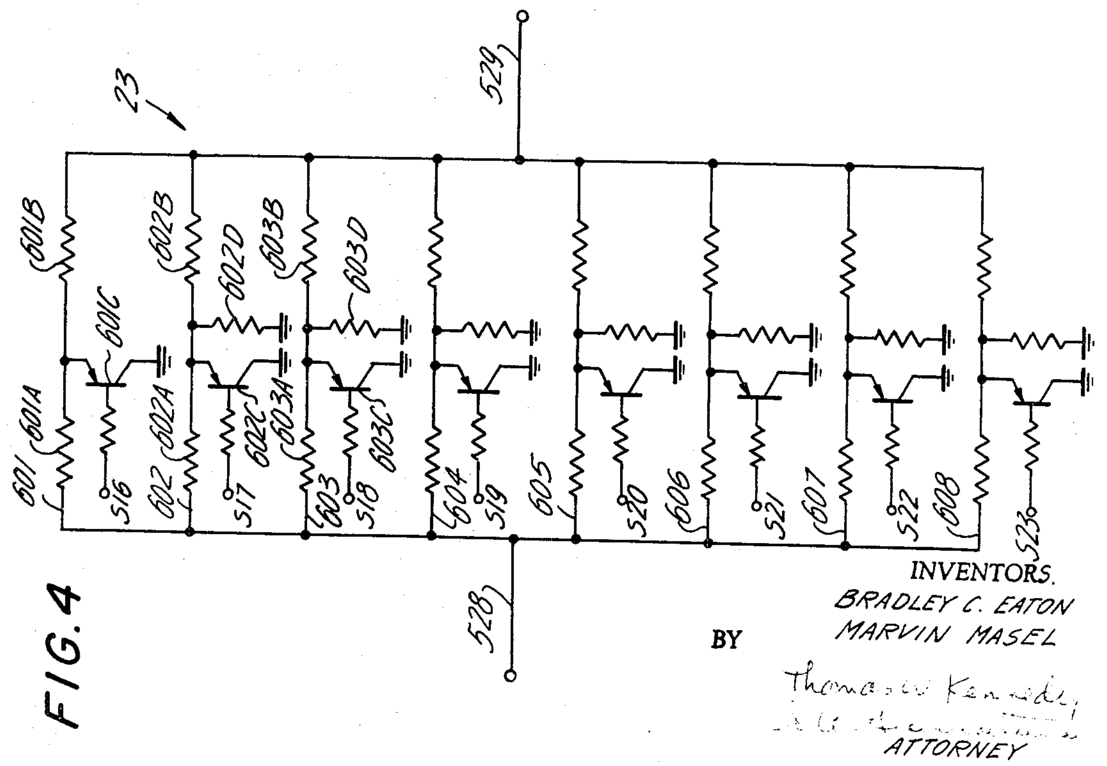
FIG. 4 is a circuit diagram showing the detailed construction of the $\beta$ attenuation network of the converter.

The circuit diagram of the $\beta$ attenuation network is shown in FIG. 4 of the drawings wherein it is seen that the network comprises eight parallel branches 601 through 608. Branch 601 is composed of serially connected resistors 601A and 601B which have their junction point shunted to ground through a transistor switch 601C which is coupled to the control input terminal S16. Branch 602 is composed of resistors 602A and 602B which are similarly shunted to ground by the action of transistor switch 602C and control terminal S17 in this branch, the junction point of the resistors 602A and 602B is also shunted to ground through a resistor 602D. Branch 603 is shown as comprising resistors 603A and 603B and a transistor switch 603C which is controlled by switch terminal S18. Again, a resistor 603D is connected between ground and the midpoint of the branch resistors. The remaining branches 604 through 608 are constructed in the same manner as branch 603 and are actuated by switch terminals S19 through S23 respectively. Again, by causing the relative resistances of the branches of the $\beta$ attenuation network 23 to have selected binary digital ladder values with respect to each other, the network may be caused to produce analog signals representing the portion $\beta$ of the digital angle in the counter represented by bits B7 through B14. The $\beta$ attenuation network 23 in effect provides a fine adjustment and in the preferred embodiment of the invention the B7 through B14 bits of the counter output exercise control in increments of 0.022°. In practice, each branch of the ladder network 23 may have a resistance approximately double the value of the next lower branch running from the top of the ladder network to the bottom. The shunt resistor D of each of branches 602 — 608 may be eliminated, if desired, since it was only used in the disclosed arrangement to permit each of the A and B resistors to have the same value.

The logic circuitry for controlling the switch terminals S16 through S23 is shown in FIG. 6 of the drawings wherein it is seen that the flip-flop module 200 produces output bits B7 through B10 while the module 100 produces the bits B11 through B14. The bit B7 is connected by a lead 201 to both inputs of a dual input NAND gate 202 which produces the bit $\overline{B7}$ at its output. The B7 bit is also connected to one input of a dual input NAND gate 203 which has its output connected to control switch terminal S16. Similarly, bit B8 is connected by lead 204 to both inputs of a dual input NAND gate 205 which produces the bit $\overline{B8}$ at its output. The B8 bit is also coupled to one input of a dual input NAND gate 206 which has its output coupled to the control switch terminal S17. The bit B9 is coupled by lead 207 to both inputs of a dual input NAND gate 208 so that the bit $\overline{B9}$ appears at the output of that gate. The bit B9 is also coupled to one input of a dual input NAND gate 209 which has its output directly coupled to switch terminal S18. Bit B10 is coupled by lead 210 to both inputs of a dual input NAND gate 211 which produces $\overline{B10}$ at its output. The B10 bit is also applied to one input of a dual input NAND gate 212 which has its output connected to switch terminal S19. It may be noted that the M3 bit which appears on lead 423 and is generated by flip-flop module 300 is connected to both inputs of a dual input NAND gate 213 so that the output thereof on lead 214 is $\overline{M3}$. This bit is applied by a lead 215 to one input of each of dual input NAND gates 216, 217, 218 and 219 which have their outputs connected to switch terminals S16, S17, S18 and S19. Similarly, the $\overline{M3}$ bit which appears on lead 427 is applied to both inputs of a dual input NAND gate 220 to provide the M3 bit at its output lead 221. The M3 bit is applied by lead 222 to one input of each of the NAND gates 203, 206, 209 and 212. Accordingly, it is seen that switches S16 through S19 are effectively controlled by bits B7 through B10 and are keyed into the overall operation of the up-down counter 18 by the addition of the M3 and $\overline{M3}$ bits.

In a similar manner, bit B11 produced by flip-flop module 100 is applied by a lead 223 to both inputs of a dual input NAND gate 224 which produces the $\overline{B11}$ bit at its output and the B11 bit is also applied to one input of a dual input NAND gate 224 having its output connected to switch terminal S20. Bit B12 is applied by lead 226 to both inputs of a NAND gate 227 and to one input of a NAND gate 228, the latter having its output connected to switch terminal S21. Bit B13 is connected by lead 229 to both inputs of a dual input NAND gate 230 and is also connected to one input of a NAND gate 231 which has its output coupled to switch terminal S22. Finally, bit B14 is connected by lead 234 to both inputs of a dual input NAND gate 233 and to one input of a dual input NAND gate 234 having its output connected to switch terminal S23. In effect, each of the gates 224, 227, 230 and 233 produces the logical inverse of its input bit. The output of gate 224 is coupled to one input of a NAND gate 235, while the output of gate 227 is coupled to one input of a NAND gate 236. The output of gate 230 is coupled to a NAND gate 237 having its output connected to switch terminal S22. Similarly, the output of gate 233 is connected to one input of a NAND gate 238 having its output connected to switch terminal S23. The $\overline{M3}$ bit appearing on lead 214 is applied to one input of each of NAND gates 235, 236, 237 and 238, while the M3 bit is applied by lead 221 to one of the inputs of each of gates 225, 228, 231 and 234. By virtue of this arrangement, the bits B7 through B14 effectively control the switch terminals S16 through S23, to cause the $\beta$ attenuation network 23 to generate a signal having a current representing the value of the $\beta$ portion of the digital angle in the up-down counter. The logic for the $\beta$ encoding is shown in the following Table III:

TABLE III

| Angle | B7 | B8 | B9 | B10 | B11 | B12 | B13 | B14 | Switches closed |
|---|---|---|---|---|---|---|---|---|---|
| 0°–.02197° | 0 | 0 | 0 | 0 | 0 | 0 | 0 | 0 | None. |
| .02197°–.44° | 0 | 0 | 0 | 0 | 0 | 0 | 0 | 1 | S16. |
| .044°–.066° | 0 | 0 | 0 | 0 | 0 | 0 | 1 | 0 | S17. |
| .066°–.088° | 0 | 0 | 0 | 0 | 0 | 0 | 1 | 1 | S16, S17. |
| . | | | | | | | | | . |
| . | | | | | | | | | . |
| . | | | | | | | | | . |
| 5.621°–5.623° | 1 | 1 | 1 | 1 | 1 | 1 | 1 | 0 | S23–S17. |
| 5.623°–5.625 | 1 | 1 | 1 | 1 | 1 | 1 | 1 | 1 | All. |

The foregoing Table III has been foreshortened for convenience of disclosure. The balance of the data is easily calculated however when it is realized that the $\beta$ network exercised control in increments of 0.022° and that each of the B7 through B14 bits controls a different one of the control terminals S-16 through S-23.

Referring again to FIG. 3 of the drawings, it is seen that the $\beta$ attenuation network 23 functions to multiply the output signal from amplifier 527 by $\beta$ to produce the signal $\beta \sin(\theta_T - \mu) \tan\alpha + \cos(\theta_T - \mu)$ at its output 529 which is then applied to the inverting input of the summing amplifier 500. Accordingly, the error signal appearing at the output of summing amplifier 500 has the form shown at output 32 in FIG. 1 of the drawings. The signal which is an AC error signal having an amplitude and phase respectively representing the magnitude and sense of the deviation between the true value of the angle in the resolver and the estimated value of the angle in the counter is coupled through an R-C coupling network comprising a capacitor 530 and a resistance 531 to the input of the phase-sensitive demodulator 33 shown in FIG. 1 of the drawings. The R-C coupling effectively removes any DC components from the error signal thereby eliminating errors caused by DC amplifier drift and switch offset and the like. Accordingly, the signal which contains the error information is an AC signal rather than a DC signal. This effectively avoids the difficulties experienced by prior art arrangements using DC error signals. The AC error signal is coupled to the phase-sensitive demodulator circuit 33 wherein it is multiplied by a carrier reference signal from the source 34 which is of the same frequency as the signal source 14 for the resolver rotor winding. The AC error signal is multiplied by the carrier reference voltage to produce a DC output signal having a magnitude and polarity which respectively represent the amplitude and phase of the AC error signal applied to the input of the demodulator. Because of the multiplication of the AC error signal by the carrier reference voltage, the phase-sensitive demodulator acts is substantially the same manner as a two-phase servo motor to virtually eliminate any errors caused by quadrature and harmonic signals. Accordingly, the analog-to-digital converter of the present invention enjoys the same immunity to quadrature and harmonic signals as an electromechanical positional servo system employing a two-phase servo motor but does not suffer from the limitations on accuracy and response time inherent in such systems. In practice, the phase-sensitive demodulator 33 may conveniently comprise a Motorola type MC1596G balanced modulator-demodulator.

Figure 5:
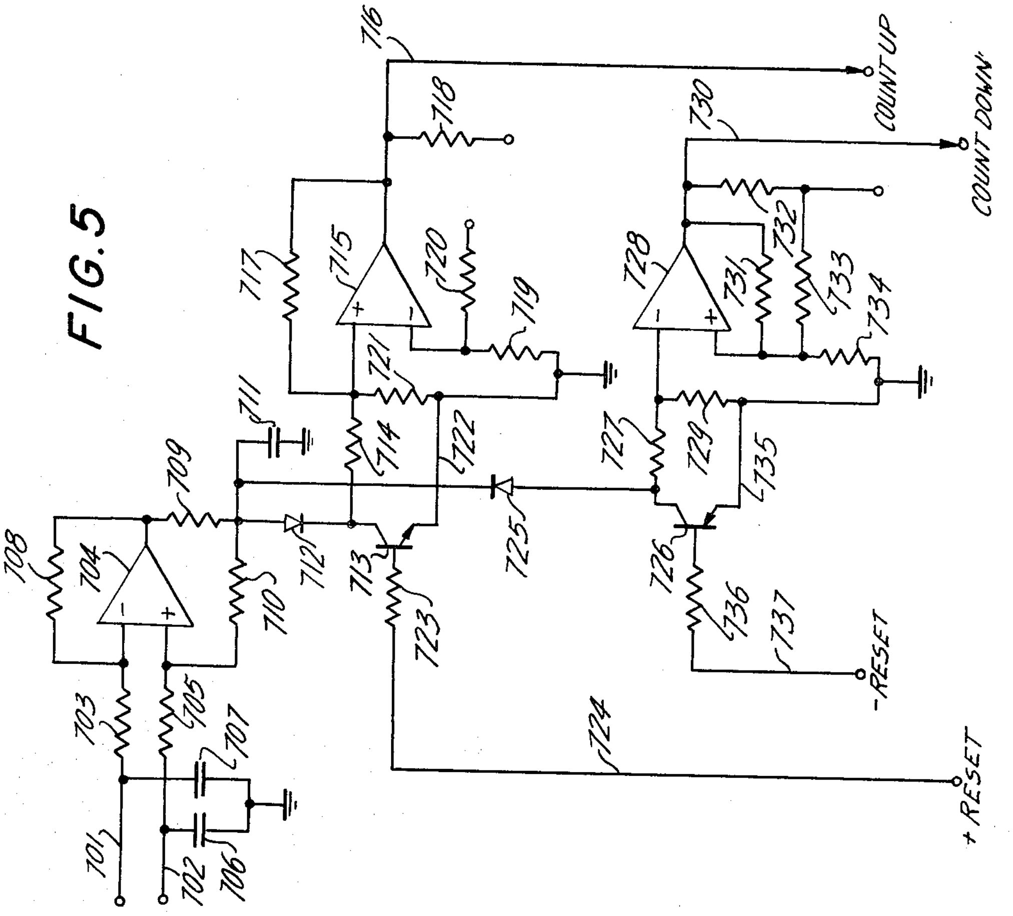
FIG. 5 is a circuit diagram of a bipolar voltage-to-frequency converter suitable for use in the analog-to-digital converter of the invention.

As seen in FIG. 5 of the drawings, the balanced outputs from the phase-sensitive demodulator 33 are applied to the input of a bipolar voltage-to-frequency converter 35. The outputs from the demodulator are coupled by leads 701 and 702 and input resistances 703 and 705 to the inverting and non-inverting inputs of an operational amplifier 704. A filter consisting of serially connected capacitances 706 and 707 having their junction point connected to ground is shunted across the input to the amplifier 704 and functions to remove any double frequency components generated during the demodulation process. The output of operational amplifier 704 is connected back to its inverting input by a feedback resistor 708 and also to its non-inverting input by serially connected resistors 709 and 710. The junction point of resistors 709 and 710 is connected to ground through a capacitor 711 and is also connected by a diode 712 and input resistors 714 and 721 to the non-inverting input of a comparator 715. The output of comparator 715 is connected by a lead 716 to the "count-up" input of the up-down counter 18. The output of comparator 715 is also coupled back to its non-inverting input by a feedback resistor 717 and is connected to a negative voltage source (not shown) by a dropping resistor 718. The inverting input of comparator 715 is connected to ground by a resistor 719 and to a positive voltage supply source (not shown) by a resistor 720. The circuit junction of diode 712 and input resistance 714 is connected to ground through a transistor 713 and a lead 722. The transistor functions as a switch having its base connected to a source of positive reset pulses by means of resistor 723 and lead 724. The output from operational amplifier 704 is also coupled by a diode 725 and input resistors 727 and 729 to the inverting input of a comparator 728. The output of comparator 728 is coupled to the "count-down" control of the up-down counter 18 by means of lead 730 and is fed back to its non-inverting input by a resistor 731. The output of this comparator is coupled to a negative voltage source (not shown) by a resistor 732, while the non-inverting input is also coupled to the same voltage source through resistor 733. A transistor 726 is arranged to shunt the junction point between diode 725 and resistor 727 to ground through its collector-emitter circuit and a lead 735. The base of the transistor is coupled to a source of negative reset pulses (not shown) through a resistor 736 and a lead 737.

In operation, when a DC output voltage from demodulator 33 is applied across the input terminals of the voltage-to-frequency converter 35, it is reproduced across the output resistance 709 where it generates a current which is used to charge capacitor 711. Most of the current so generated is employed to charge the capacitor 711 since the impedance of the capacitor is small when compared to the magnitude of the feedback resistors 708 and 710. When the voltage across the capacitor 711 is fed to comparator 715 through the diode 712, it causes the potential at the non-inverting input of the comparator to rise above the potential at the inverting input, thereby causing the output of the comparator at lead 716 to go from low to high. A positive reset pulse, which may be generated by logic circuitry (not shown) from the comparator output, is then applied by lead 724 to the base of transistor 713, so that the collector-emitter circuit of the transistor acts as a switch to shunt the voltage across capacitor 711 to ground thereby discharging it. When the potential at the non-inverting input of the comparator falls below the potential at the inverting input, the output of the comparator becomes low again, so that with a continuously applied DC signal at the input to amplifier 704, the comparator 715 is caused to produce a series of output pulses having a pulse repetition rate dependent upon the magnitude of the DC signal from the phase-sensitive demodulator 35. In a similar manner, the comparator 728 functions to produce a series of output pulses at the lead 730 in response to DC signals of opposite polarity from the demodulator 33. This series of pulses is employed to cause the counter 18 to count down and again, the pulse repetition rate is dependent upon the magnitude of the DC signal from the demodulator.

Accordingly, when the counter 18 is producing a binary digital output which represents an angle different from the angle of the resolver input shaft, the AC error signal which is produced by the action of the attenuation networks represents by its amplitude and phase the respective magnitude and sense of the deviation between the counter setting and the true value of the input angle. The error signal is then employed in the manner of a servo signal to drive the up-down counter to a null setting wherein its output represents the true value of the resolver input angle. By virtue of this arrangement, the analog-to-digital converter of the invention provides 13 bit accuracy with 14 bit resolution and effectively operates as a solid state proportional servo system. A converter of this type readily lends itself to multiplex operation with a plurality of input resolver signals because of its extremely rapid response time. The rapid response time of the converter in effect virtually eliminates the problem of "staleness" of digital data which is sometimes even present in prior art solid state conversion systems. It is believed apparent that the analog-to-digital converter of the present invention could be used with three-wire analog input signals, such as those obtained from synchros, for example, by employing a suitable conversion network, such as a "Scott Transformer" which effectively converts the three-wire analog signal from the synchro into a four-wire resolver type analog signal.

It is believed apparent that many changes could be made in the construction and described uses of the foregoing analog-to-digital converter and many seemingly different embodiments of the invention could be constructed without departing from the scope thereof. Accordingly, it is intended that all matter contained in the above description or shown in the accompanying drawings shall be interpreted as illustrative and not in a limiting sense.

What is claimed is:

1. An analog-to-digital converter for converting first and second analog input signals representing an angle into binary digital output signals representing said angle comprising:
   - counter means having an input and an output and operable to produce binary digital output signals representing the estimaged value of said angle;
   - octant selection means coupled to the output of said counter means for control thereby and having an input adapted to receive said first and second analog input signals, said octant selector means operable in response to a first group of the most significant bits of said binary digital output signals to modify said first and second analog input signals to produce an output of third and fourth signals respectively representing the cosine and sine of the deviation between the true value of said angle and the portion of the estimaged angle in the counter represented by said first group of bits;
   - digitally controlled circuit means coupled to at least a portion of the output of said counter means for control thereby and having an input adapted to receive said third and fourth signals to produce an output including an AC analog error signal having an amplitude and phase respectively representing the magnitude and sense of the difference between the estimated and true values of said angle;
   - said digitally controlled circuit means further including first and second attenuation network means operable in response to a second group of the next most significant bits of said binary digital output signals to multiply the said third and fourth signals from the octant selection means by the tangent of the portion of the estimated angle in the counter means represented by said second group of bits, to thereby produce fifth and sixth signals respectively;
   - phase-sensitive demodulator means coupled to the output of said circuit means for multiplying said AC error signal by an AC reference signal to produce DC output signals having a magnitude and polarity respectively representing the amplitude and phase of said AC error signal; and
   - bipolar voltage-to-frequency converter means coupled between the output of said demodulator means and the input of said counter means for converting said DC output signals into digital pulse output signals having a pulse repetition rate representing the magnitude of said DC signals, whereby said digital pulse output signals drive said counter means to a null setting wherein the binary digital output from the counter means represents the true value of said angle.

2. An analog-to-digital converter as claimed in claim 3, wherein said digitally controlled circuit means further comprises third attenuation network means operable in response to a third group of bits consisting of the remaining bits of said binary digital output signals to multiply the sum of said third and sixth signals by the portion of the estimated angle in the counter means represented by said third group of bits, to thereby produce a seventh signal.

3. An analog-to-digital converter as claimed in claim 2, wherein said digitally controlled circuit means further comprises summing means for summing said seventh signal with an eighth signal representing the difference between said fourth and fifth signals to thereby produce said AC error signal.

4. An analog-to-digital converter as claimed in claim 3, wherein said first, second and third attenuation network means comprise digitally controlled ladder networks formed by switch-controlled parallel circuit branches.

5. An analog-to-digital converter as claimed in claim 4, wherein said first group of bits comprises the three most significant bits of a 14 bit output from said counter means and said second group of bits comprises the next three most significant bits of said fourteen bit output.

6. An analog-to-digital converter as claimed in claim 1, wherein said first and second analog input signals comprise a first AC input signal having the form cos $\theta_T$ and a second AC input signal having the form sin $\theta_T$, and wherein said AC error signal has the form sin $(\theta_T-\mu)[\beta\tan\alpha-1]$ + cos $(\theta_T-\mu)[\tan\alpha+\beta]$, where $\theta_T$ is the true value of said angle, $\mu$ is proportional to a group of the most significant bits of said binary digital output signals, $\alpha$ is proportional to a group of the next most significant bits of said binary digital output signals, and $\beta$ is proportional to the remaining bits of said binary digital output signals.

* * * * *

PO-1050
(5/69)

UNITED STATES PATENT OFFICE
CERTIFICATE OF CORRECTION

Patent No. 3,668,693 Dated June 6, 1972

Inventor(s) Bradley C. Eaton/Marvin Masel

It is certified that error appears in the above-identified patent and that said Letters Patent are hereby corrected as shown below:

Col. 6 line 30 delete "M 1" and substitute "$\overline{M\ 1}$".

Col. 6 line 32 delete "M 1" and substitute "$\overline{M\ 1}$".

Col. 7 Table 1 under M3, 5th line, delete "11" and substitute "0".

Col. 14 line 67 Claim 2, after claim, deelte "3" and substitute "1".

Col. 9 Table II under A6 2nd line, delete "0" and substitute "1".

Col. 11 Table III under Angle - 2nd line delete".44°" and substitute -- .044° --.

Signed and sealed this 6th day of March 1973.

(SEAL)
Attest:

EDWARD M.FLETCHER,JR.
Attesting Officer

ROBERT GOTTSCHALK
Commissioner of Patents